Dec. 7, 1971   C. L. FARRAND   3,624,910
MULTIAXIS INSPECTION SYSTEM
Filed Aug. 27, 1969   4 Sheets-Sheet 1

INVENTOR
CLAIR L. FARRAND
BY W. E. Beatty
David E. Lovejoy
ATTORNEYS.

Dec. 7, 1971  C. L. FARRAND  3,624,910
MULTIAXIS INSPECTION SYSTEM
Filed Aug. 27, 1969  4 Sheets-Sheet 2

INVENTOR
CLAIR L. FARRAND
BY W. E. Beatty
David E. Lovejoy
ATTORNEYS.

Dec. 7, 1971  C. L. FARRAND  3,624,910
MULTIAXIS INSPECTION SYSTEM
Filed Aug. 27, 1969  4 Sheets-Sheet 3

INVENTOR
CLAIR L. FARRAND
BY
W. C. Beatty
David E. Lovejoy
ATTORNEYS.

Dec. 7, 1971  C. L. FARRAND  3,624,910

MULTIAXIS INSPECTION SYSTEM

Filed Aug. 27, 1969  4 Sheets-Sheet 4

INVENTOR
CLAIR L. FARRAND
BY
W. E. Beatty
David E. Lovejoy
ATTORNEYS.

United States Patent Office 3,624,910
Patented Dec. 7, 1971

1

3,624,910
MULTIAXIS INSPECTION SYSTEM
Clair L. Farrand, Bronxville, N.Y., assignor to
Inductosyn Corporation, Carson City, Nev.
Filed Aug. 27, 1969, Ser. No. 853,237
Int. Cl. B43l 5/00
U.S. Cl. 33—1 M
4 Claims

ABSTRACT OF THE DISCLOSURE

A bearing arrangement for the movable carriages of a multiaxis inspection system comprising first and second mutually orthogonal shafts; first and second carriages, the second shaft being secured to the first carriage; bearing means for supporting the first and second carriages for movement relative to the first and second shafts, respectively, the bearing means for each of the carriages comprising first and second sets of recirculating balls which contact the shafts at a plurality of points along two lines on opposite sides of the circumference thereof above the longitudinal axes; and constraint, slide bearing means spaced from and below the shafts for preventing rotation of the first and second carriages about the longitudinal axes of the first and second shafts, respectively. The sets of recirculating balls and the constraint, slide bearing means form three-point supports for the carriages. The second carriage supports a probe for movement along an axis which is orthogonal to the axes of the first and second shafts.

The shafts may be rotated in order to select the location of the two lines contacted by the balls, the constraint, slide bearing means may be adjusted to insure linear motion of the carriages, and the angle between the first and second shafts may be adjusted to insure perpendicularity therebetween.

BACKGROUND OF THE INVENTION

(1) Field of the invention

The present invention relates to a multiaxis inspection system and, more particularly, to a bearing arrangement for the movable carriages of a multiaxis inspection system.

(2) Description of the prior art

Inspection machines for measuring dimensions on a workpiece including, but not limited to, tool and die layouts, parts, printed circuits, etc., are well known and widely used in the art. Such inspection machines generally include a probe which is supported by a carriage, the latter being movable along first and second orthogonal axes. In addition, the probe may be movable with the carriage or independently thereof along a third orthogonal axis.

In a typical inspection machine operation, a workpiece having dimensions to be measured is aligned on a work table. A reference position is selected and the probe is moved to that position. A suitable display which is utilized to read out dimensions is set to zero at the reference position. The probe is then moved to a selected position on the workpiece, whereupon the dimensions read out by the display are checked against a specification to determine whether the workpiece has been constructed accurately. Once this determination has been made, a new position is selected and the procedure is repeated until the dimensions of the workpiece have been measured. Measurements may be taken only along the X and Y axes in cases where the workpiece has a planar surface or measurements may be taken along X, Y and Z axes in cases where the workpiece has raised and lowered portions displaced from a planar surface.

Herefore, it has been necessary to construct an inspection machine such that every critical component is made with the same degree of accuracy that the machine is to be able to measure. In other words, if it will be necessary for the inspection machine to make measurements on a workpiece within one-thousandths of an inch, the parts of the inspection machine must be made and assembled with an accuracy of at least one-thousandths of an inch. Similarly, if the inspection machine is to be used to make measurements on a workpiece with an accuracy of ten-thousandths of an inch, the inspection machine must be made with an accuracy of ten-thousandths of an inch. As a result, existing inspection machines, most of which have a plurality of machine ways which support, via ball bearings, the movable carriage, require the machine ways to be machined with the same accuracy as the workpiece to be inspected. If the height of the ways is not maintained within the appropriate tolerance, positional readings will be in error. Similarly, if the sides of the ways which the ball bearings contact to prevent lateral movement are not maintained within the required tolerance, excessive lateral movement will result in erroneous positional readings.

The requirement for manufacturing inspection machines with the same degree of accuracy as will be required in the operation of the machine has presented at least two serious problems. In the first instance, since the cost of any machine is always directly a function of the accuracy and permissible tolerances used in its construction, essentially all presently existing inspection machines which are utilized to make precision measurements are very expensive. Secondly, by carefully machining and assembly, with a high degree of accuracy, existing inspection machines, they do not include, when assembled, an ability to be adjusted. This is a serious disadvantage in that an inspection machine may require re-alignment as a result of shock, temperature changes, and/or other environmental changes. For example, if a shock occurs, the bearings which constrain lateral motion may be displaced from their original position. In addition, the machine ways could be forced out of position. Temperature changes could cause the ways to increase in size and interfere with the movement of the carriage. The resultant displacements cause the position measurements to be in error until the machine is re-aligned, which is usually a complicated and time-consuming process. Furthermore, during the re-alignment period, the machine must be taken out of service thereby stopping the inspection process.

SUMMARY OF THE INVENTION

According to the present invention, there is provided a novel inspection machine or measuring apparatus which substantially solves all of the problems specified above. The present inspection machine avoids the necessity for manufacturing the machine elements with the same degree of accuracy as will be required in the inspection of a workpiece. This is achieved by providing an inspection machine in which each critical machine element is adjustable. In this manner, the machine can be constructed having one degree of accuracy and then subsequently adjusted to permit measurements with a higher degree of accuracy. The results are two-fold. In the first instance, by constructing a machine without stringent requirements that the dimensions in each part conform to very exact specifications, the cost of the machine is drastically reduced. In addition, by providing a machine which is easily assembled and then adjusted, re-alignment procedures, where necessary, are achieved in a rapid manner thereby minimizing the time that the inspection machine is out of service. An additional benefit derived from the present inspection machine is that after initial alignment, it is relatively unaffected by slight shocks, temperature changes and other environmental changes. The present carriage has the capability of re-locating itself to the position to which it was aligned after a disturbance.

Briefly, the present multiaxis inspection machine comprises a horizontal fixed shaft forming the X axis. An X carriage is slideable on that shaft. The X carriage has mounted thereon a horizontal fixed shaft forming the Y axis. A Y carriage is slideable on the Y shaft and it carries an upright tool holder for a probe which is adjustable along the Z axis. Each carriage has slide bearings including sets of recirculating ball bearings. The ball bearings of each set contact its respective shaft on a line parallel to the axis of the shaft. In this manner, the roundness, finish and diameter of the shafts become relatively insignificant. Furthermore, an adjustable slide bearing for each carriage controls the parallel movement thereof. Each slide bearing includes a track which is easily adjusted to permit ready calibration of the entire inspection machine. Finally, a position measuring transformer of the Inductosyn type is mounted along each axis for providing signals indicative of the movement of the carriages and probe to a suitable display for reading out the precise position of the probe relative to a reference position.

It is, therefore, an object of the present invention to provide a novel multiaxis inspection system.

It is a further object of the present invention to provide a multiaxis inspection system in which movable members are kinematically supported along each of a plurality of mutually orthogonal axes.

It is a still further object of the present invention to provide a multiaxis inspection system which permits measurements to be made within greater tolerances than utilized to construct the machine itself.

It is another object of the present invention to provide a multiaxis inspection system in which the paths of all movable elements may be readily adjusted for calibration and alignment.

It is still another object of the present invention to provide a multiaxis inspection system which reduces erroneous measurements due to changes in alignment due to shock, temperature changes, etc.

Another object of the present invention is the provision of a multiaxis inspection machine in which accurate measurements are relatively less dependent on dimensions of certain machine parts.

Still another object of the present invention is the provision of a three-point support for the movable carriages of a multiaxis inspection machine.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
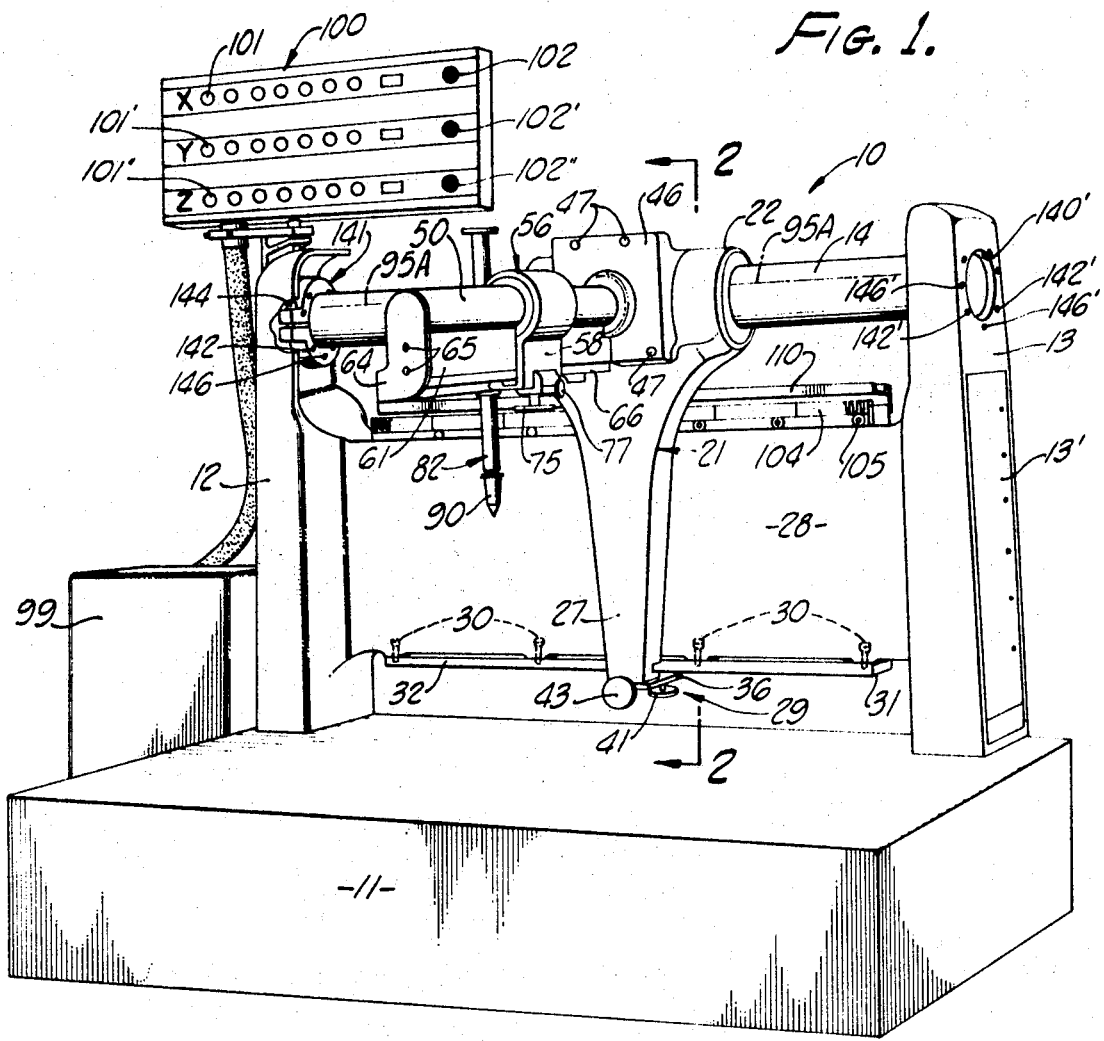
FIG. 1 is a perspective view of the present multi-axis inspection system.
Figure 5:
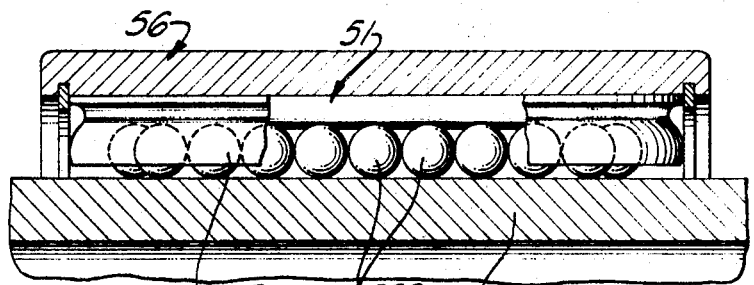
FIG. 5 is an enlarged, cross-sectional view taken along the line 5—5 in FIG. 4.
Figure 6:
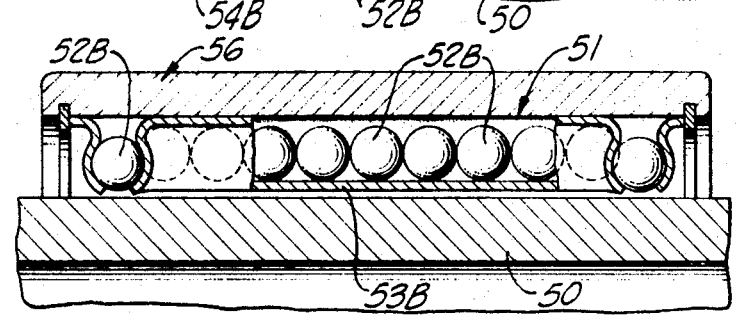
FIG. 6 is an enlarged, cross-sectional view taken along the line 6—6 in FIG. 4.

Referring now to the drawings and, more particularly, to FIGS. 1–3, 7 and 8 thereof, the present inspection machine, generally designated 10, includes a base 11 on which a workpiece to be inspected may be placed. Base 11 supports a pair of upright members 12 and 13 which secure the opposite ends of a shaft 14 which defines the X axis of inspection machine 10. Upright member 13 includes a cylindrical hole 140' and upright member 12 includes a similar hole, not shown, through which shaft 14 extends. A pair of split collars 141 and 141' are secured to upright members 12 and 13, respectively, by screws 142 and 142', respectively, such that the axes of shaft 14, collars 141 and 141', and holes like 140' are all aligned. Screws 142 and 142' extend through holes like 143' in split collars 141 and 141', respectively, which are slightly greater than the diameter of screws 142 and 142' so that collars 141 and 141' may be moved in a vertical direction relative to upright members 12 and 13 to level shaft 14. Split collars 141 and 141' are adapted to be tightened around shaft 14 by means of screws 144 and 144', respectively. By loosening screws 144 and 144', shaft 14 may be rotated about its longitudinal axis. Finally, a plurality of holes like 145' may be drilled through split collars 141 and 141' and upright members 12 and 13, respectively, after the positions of split collars 141 and 141' have been finally determined. By inserting a plurality of pins 146 and 146' in holes like 145', split collars 141 and 141' may be locked in place.

Figure 2:
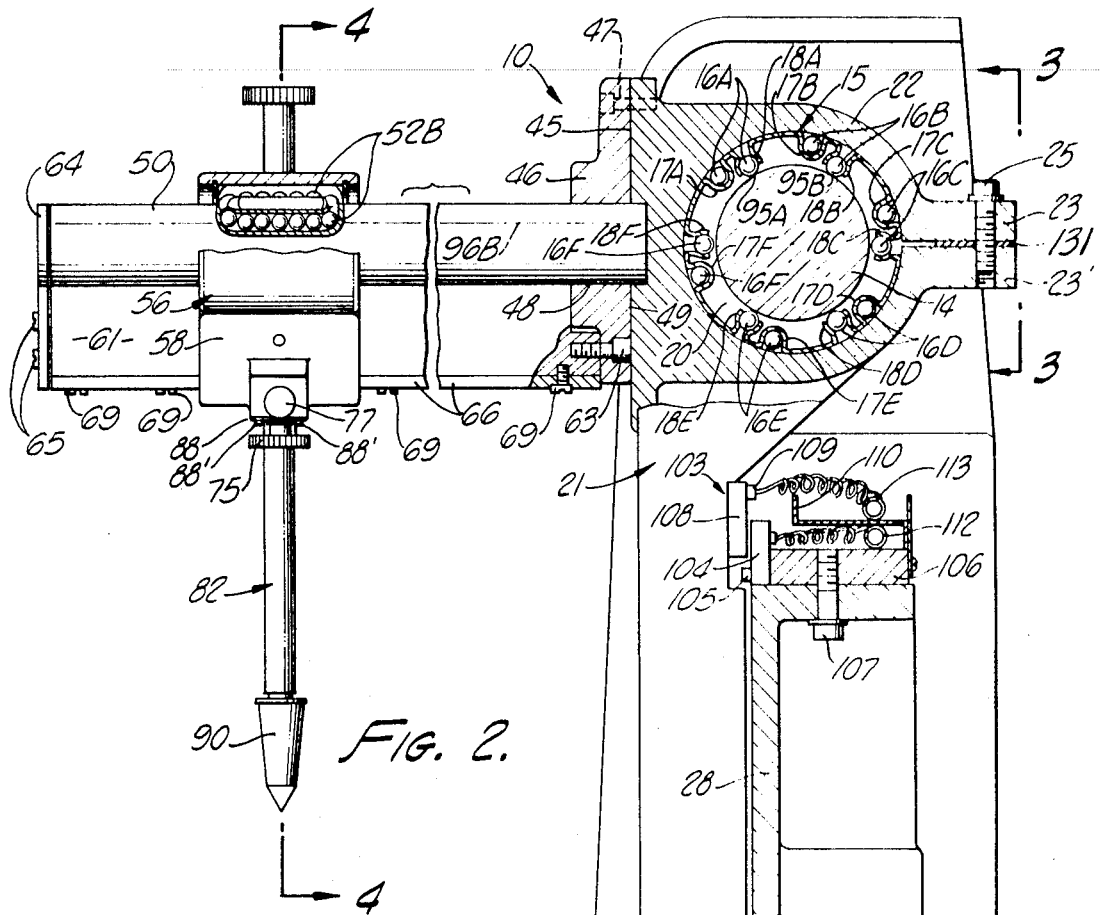
FIG. 2 is an enlarged, side sectional view taken along the line 2—2 in FIG. 1.

As will be explained more fully hereinafter, shaft 14 is part of a slide bearing 15 which also includes a plurality of recirculating balls, generally designated 16. Balls 16 are arranged in six sets, 16A, 16B, 16C, 16D, 16E and 16F, the sets circulating in a direction parallel to the axis of shaft 14 in continuous raceways having first and second parallel sections 17A and 18A, 17B and 18B, 17C and 18C, 17D and 18D, 17E and 18E, and 17F and 18F, respectively. In other words, all of balls 16A and raceway section 18A are in contact with a line 95A along the surface of shaft 14 parallel to the axis thereof, all of such balls travelling in the same direction in raceway section 18A. The remaining balls 16A in raceway section 17A do not contact shaft 14 but travel in the same direction opposite to the direction of travel of balls 16A in raceway section 18A. According to the preferred embodiment of the present invention, and as shown in FIG. 2, six rows of equally spaced ball bearings are positioned around shaft 14.

Raceways 17A, 18A through 17F, 18F are located within a cylindrical opening 20 in an X axis carriage 21. Carriage 21 includes an upper portion 22 which surrounds shaft 14 and terminates in the back thereof in first and second pairs of upper and lower flanges 23, 23' and 24, 24' which are separated at 26 and 26', respectively. Flanges 23 and 23' and flanges 24 and 24' are connected by means of screws 25 and 25', respectively.

X axis carriage 21 also includes a lower portion 27 which extends in a generally vertical direction from upper portion 22 toward base 11 of inspection machine 10. Lower portion 27 is parallel to but spaced from a generally rectangular, vertically positioned, support member 28 which is fixedly connected between upright members 12 and 13. The entire carirage 21 is adapted to move along the X axis with respect to shaft 14 and support member 28. Support member 28 has connected at the bottom thereof via a plurality of screws 30 an elongated, rectangular track 31 which is one portion of an adjustable, constraint slide bearing, generally designated 29. Screws 30 extend through holes 19 in support member 28 which are slightly greater than the diameter of screws 30 so that track 31 may be moved in a horizontal plane for adjustment of slide bearing 29. The front surface 32 of track 31 is aligned parallel to the X axis. Lower portion 27 of carriage 21 supports the remainder of bearing 29 which includes a roller 34 mounted for rotation in a recess 33 in lower portion 27 about a vertical shaft 39 by ball bearing means 35. Shaft 39 is in the form of a screw which extends through an inner race 35' of ball bearing means 35 and secures race 35' to lower portion 27 of carriage 21. A washer 35" on each side of race 35' may be utilized to space race 35' from the walls which define recess 33. Roller 34 is actually the outer race of ball bearing means 35 and is separated from inner race 35' by a plurality of balls 35'''. Roller 34 is adapted to roll along surface 32 of track 31 as X axis carriage 21 moves along shaft 14. A housing 36 connected to the bottom of lower portion 27 of carriage 21 by screws 37 extends beneath track 31 past rear surface 40 thereof. Housing 36 has a vertically positioned hole 40' therein which is substantially aligned with rear surface 40 of track 31. A rotatable drive shaft 38 extends through a hollow sleeve 38' and is rotatably supported by bearing means (not shown) located within sleeve 38'. Sleeve 38' extends through hole 40' in housing 36 and is secured to a thin, elongated, flexible plate 41' which is connected to the top surface 36' of housing 36 by screws (not shown). Drive shaft 38 terminates at its lower end in an operating knob 41. Flexible plate 41' normally maintains drive shaft 38 and its periphery 42' out of driving relation with surface 40 of track 31. A knob 43 connected to the inner end 43' of a threaded coupling shaft 42 may be rotated to an initial position wherein its outer end 43" contacts sleeve 38' to urge outer end 42' of operating knob 41 into driving relation with track 31 whereby carriage 21 may be moved longitudinally along X shaft 14 by operating knob 41. Knob 43 may be operated to a locked position wherein outer end 43" of threaded coupling shaft 42 applies sufficient pressure against track 31 to secure carriage 21 against movement. Threaded coupling shaft 42 is in threaded engagement with a threaded bore 44 in housing 36. When knob 43 is operated to retract threaded coupling shaft 42, outer end 42' of drive shaft 38 is out of contact with track 31 whereby carriage 21 may be freely moved along the X axis.

Referring now to FIGS. 1, 2 and 4-6, upper portion 22 of X axis carriage 21 has, along the front thereof, a flat face 45 which is adapted to have secured thereto the flat face 49 of a plate 46 by screws 47. Plate 46 includes a hole 48 which receives one end of a shaft 50 which defines the Y axis of inspection machine 10. Shaft 50 is part of a slide bearing 51 which also includes a plurality of recirculating balls, generally designated 52. Balls 52 are arranged in two sets 52A and 52B. As was the case with X axis slide bearing 15, sets 52A and 52B circulate in a direction parallel to the axis of shaft 50 in continuous raceways having first and second parallel sections 53A and 54A, and 53B and 54B, respectively, with all of balls 52A and 52B in raceway sections 54A and 54B in contact with a pair of straight lines 96A and 96B along the surface of shaft 50 parallel to the axis thereof, and with all of balls 52A and 52B in raceway sections 53A and 53B out of contact with shaft 50.

Raceways 53A, 54A and 53B, 54B are located within a cylindrical opening 55 in a Y axis carriage 56. The bottom portion of Y axis carriage 56 includes opposed, spaced walls 57 and 58 forming a recess 59 therebetween. Positioned within recess 59 and attached to the bottom of shaft 50 via screws 62 is a generally rectangular, vertically positioned, support member 61 which is also connected at one end thereof to plate 46 via a screw 63. A plate 64 is connected via screws 65 to the other ends of shaft 50 and member 61.

Support member 61 has connected at the bottom thereof via a plurality of screws 69 an elongated, rectangular track 66 which is one portion of an adjustable, constraint, slide bearing, generally designated 60. Screws 69 extend through holes 89 in track 66 which are slightly greater than the diameter of screws 69 so that track 66 may be moved in a horizontal plane for adjustment of slide bearing 60. The opposite surfaces 67 and 68 of track 66 are aligned parallel to the Y axis. Slide bearing 60 also includes a roller 70 mounted for rotation about a vertical shaft 72 by ball bearing means 71. Roller 70 is adapted to roll along surface 67 of track 66 as Y axis carriage 56 moves along shaft 50. Shaft 72 is threaded and is secured to wall 57 by a suitable nut 73. A rotatable drive shaft 74 extends through a hollow sleeve 78 and is rotatably supported by ball bearing means 78' located within sleeve 78. Sleeve 78 is secured to a thin, elongated, flexible plate 88 which is connected to the bottom of Y axis carriage 56 by screws 88' (see FIG. 2). Drive shaft 74 terminates at its lower end in an operating knob 75.

Flexible plate 88 normally maintains drive shaft 74 and its periphery 74' out of driving relation with surface 68 of track 66. A knob 77 of a lock screw 76 may be rotated to an initial position wherein its outer end 76" contacts sleeve 78 to urge outer end 74' of operating knob 75 into driving relation with track 66 whereby carriage 56 may be moved longitudinally along Y shaft 50 by operating knob 75. Knob 77 of lock screw 76 may be operated to a locked position wherein outer end 76" of screw 76 applies sufficient pressure against track 66 to secure carriage 56 against movement. Knob 77 is on the inner end 76' of screw 76 having threaded engagement with a bore 79 in wall 58 of carriage 56. When knob 77 is operated to retract screw 76, outer end 74' of drive shaft 74 is out of contact with a track 66 whereby carriage 56 may be freely moved along the Y axis.

Figure 4:
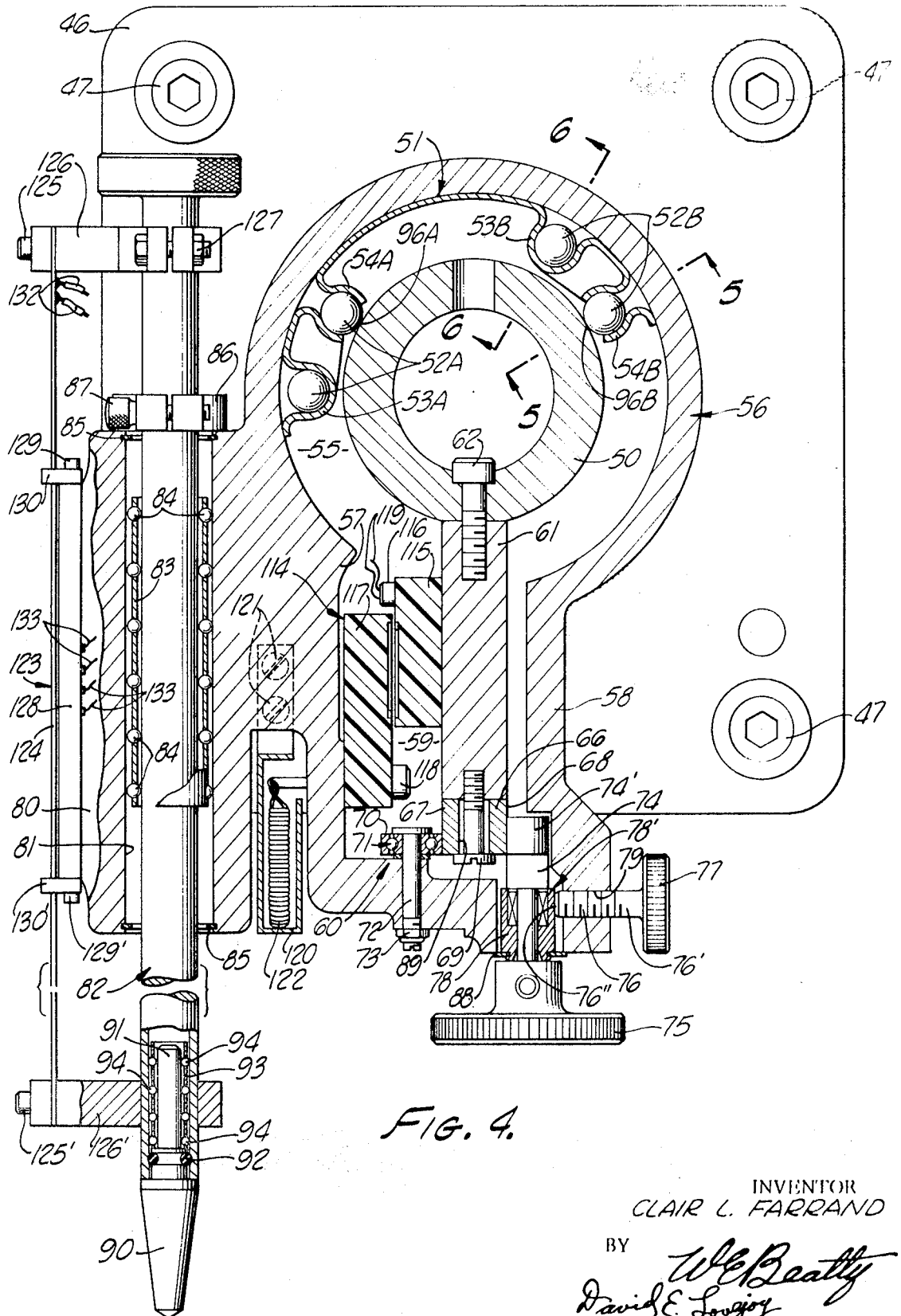
FIG. 4 is an enlarged, front sectional view taken along the line 4—4 in FIG. 2.
Figure 7:
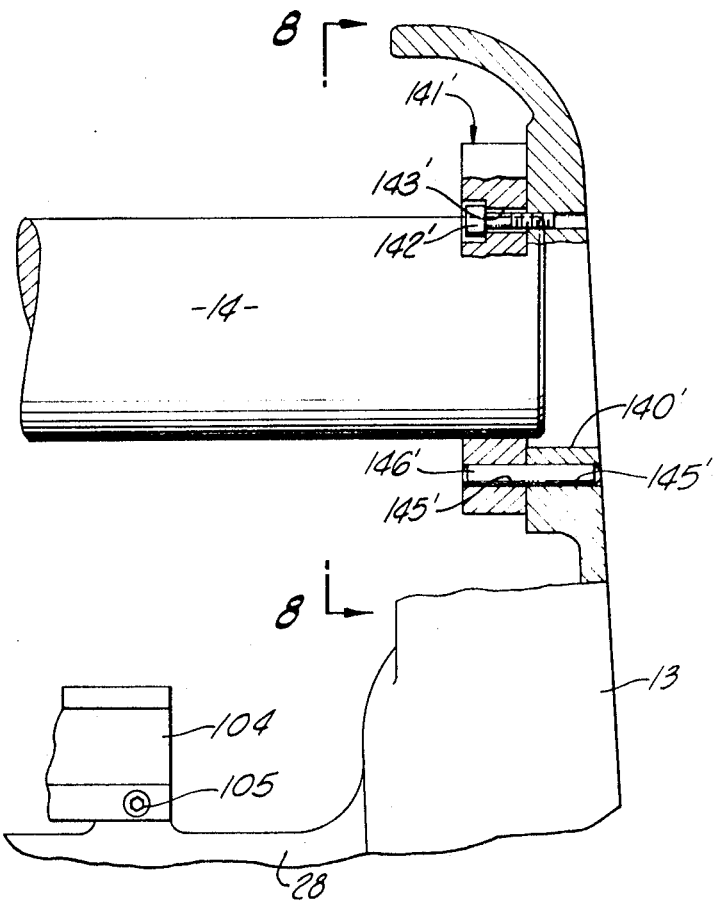
FIG. 7 is an enlarged, front elevation view, partly in section, of a portion of the inspection machine of FIG. 1.
Figure 8:
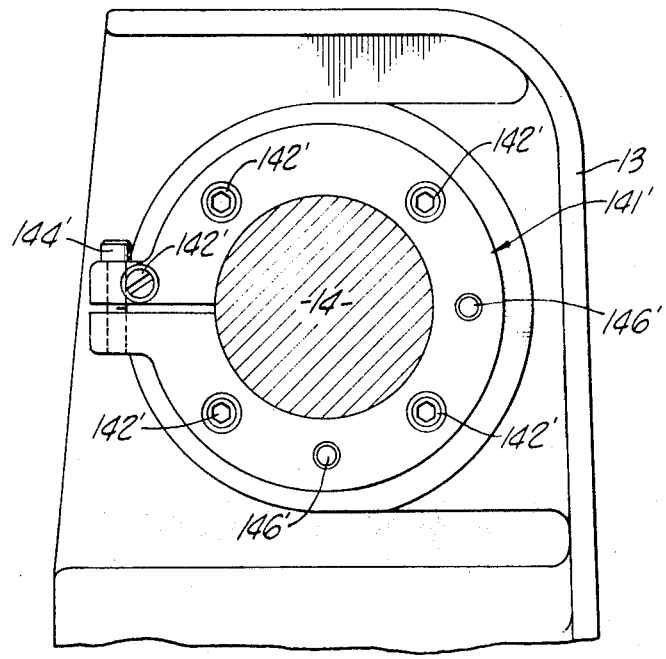
FIG. 8 is a cross-sectional view taken along the line 8—8 in FIG. 7.

Referring now to FIG. 4, Y axis carriage 56 includes a flange 80 spaced from wall 57, flange 80 including a vertically positioned bore 81 therein which defines the Z axis of inspection machine 10. A probe 82 is operative to reciprocate through bore 81. For this purpose, a cage 83 which supports a plurality of balls 84 is positioned within bore 81 encircling probe 82 with balls 84 contacting the inner surface of bore 81 and the outer circumference of probe 82. Cage 83 moves in bore 81 a distance which is one-half of the travel of probe 82. In this manner, probe 82 is operative to freely reciprocate within bore 81, retaining rings 85 preventing removal of cage 83 from bore 81. In addition, a split collar 86 is adapted to be tightened around probe 82 by means of a screw 87. Split collar 86 is adapted to be positioned anywhere along the length of probe 82 to act as a stop and prevent downward motion beyond a particular point.

The lower end of probe 82 is hollow in order to receive a tip 90 having any one of many possible shapes for measuring dimensions on a workpiece. For example, a conically shaped tip, as shown in FIG. 4, would be used when measuring the location of a hole in the workpiece. On the other hand, if measurements were being made to a flat surface, a rectangular or square tip would be more appropriate. Upright member 12 or upright member 13 may be made hollow and include a door 13' so that various shaped tips may be stored therein. In any event, tip 90 includes an extension 91 for insertion into probe 82. A rubber washer 92 which fits around extension 91 is compressed between extension 91 and the inside of probe 82 to hold tip 90 in place. Finally, a cage 93 and a plurality of balls 94 guide extension 91 and insure that it is centered within probe 82.

From the foregoing description, it is evident that there is provided an inspection machine 10 which includes a probe 82 which is capable of movement along first, second and third orthogonal axes. More specifically, probe 82 is operative to reciprocate within bore 81 along the Z axis of inspection machine 10. Probe 82 is further operative to reciprocate with carriage 56 along shaft 50, the Y axis of inspection machine 10. Finally, probe 82, carriage 56 and shaft 50 are adapted to move with carriage 21 along shaft 14, the X axis of inspection machine 10. In order to determine the position of probe 82 along the X, Y and Z axes, a display 100 and associated electronics 99 are provided. Display 100 includes indicator tubes 101, 101', and 101" for displaying the position of probe 82 along the X, Y and Z axes, respectively, relative to a refeernce position. The display is in numerical form and the desired accuracy of the measurements determines the number of indicator tubes necessary. Zeroing knobs 102, 102' and 102" are used to set the tubes at zero at a desired location so that measurements can easily be initiated from any location on the workpiece.

The signals for driving display 100 are derived from position measuring devices aligned with the X, Y and Z axes. More specifically, and referring to FIGS. 1 and 2, the position measuring device for the X axis, generally designated 103, includes a stationary scale member 104 which is secured by screws 105 to a plate 106 which is attached by means of screws 107 to support member 28. Position measuring device 103 also includes a movable slider member 108 which is secured to lower portion 27 of carriage 21 by means of screws 109. A trough 110 secured to the back of plate 106 supports a pair of conductors 112 and 113 for making electrical connections to scale and slider members 104 and 108, respectively.

Similarly, and as shown in FIG. 4, the Y axis position measuring device, generally designated 114, includes a stationary scale member 115 which is secured by screws 116 to member 61. Position measuring device 114 further includes a slider member 117 secured by screws 118 to wall 57 of Y axis carriage 56. A trough 120 secured by screws 121 to plate 46 contains a first set of conductors 122 for conducting electrical signals to slider member 117. A similar set of conductors 119 conducts electrical signals to scale member 115.

Finally, and as shown in FIG. 4, the Z axis position measuring device, generally designated 123, includes a movable member 124 in the form of a tape secured at its opposite ends via screws 125 and 125' to a pair of split collars 126 and 126', respectively, which include screws 127 and 127', respectively (the latter not being shown) for tightening collars 126 and 126' around probe 82 at the opposite ends thereof so that member 124 is movable with probe 82. Position measuring device 123 also includes a relatively stationary member 128 which is fixedly secured to flange 80 of Y axis carriage 56. Stationary member 128 has attached thereto by screws 129 and 129' a pair of guide members 130 and 130' which guide the path of movable member 124 relative to stationary member 128. Finally, suitable eelctrical conductors 132 and 133 conduct electrical signals to and from movable and stationary members 124 and 128, respectively.

Although several position measuring devices can be used within the scope of the present invention, a preferred type of device is commerically marketed under the registered trademark "Inductosyn." Details as to the construction and manner of operation of this type of position measuring device can be found in U.S. Pat. No. 2,799,835, issued on July 16, 1957, to R. W. Tripp for a Position Measuring Transformer. As described more fully therein, scale members 104 and 115 may be comprised of a plurality of adjacent sections which are connected together to form a composite scale extending the length of the travel of carriages 21 and 56, respectively. Scale members 104 and 115 comprise continuous windings in which adjacent conductors of the winding carry current in opposite directions. The center to center spacing of three adjacent conductors form an electrical cycle of 360°.

In general, slider members 108 and 117 comprise polyphase windings disposed on a substrate adjacent to the windings of scale members 104 and 115, respectively. The polyphase windings are geometrically spaced relative to each other as a function of the trigonometric relationship of the input signals to the windings. For example, if signals representing sine and cosine trigonometric functions are provided as inputs to slider members 108 and 117, two groups of windings displaced from each other by 90 electrical degrees relative to the cycle formed by the scale windings would be required for the slider windings. In other applications, other spacings or groups of windings may be required.

Current flowing in the slider windings is inductively coupled to the scale windings as a function of the position of the members relative to each other. As a result, signals from both devices, often referred to as error signals, represent the position of probe 82 along both X and Y axes relative to a reference position.

Movable and stationary members 124 and 128, respectively, of Z axis position measuring transformer 123, although operating in the exact same manner as position measuring transformers 103 and 114 for the X and Y axes, respectively, may be of the type described and claimed in U.S. patent application Ser. No. 806,820, filed Mar. 13, 1969, issued as U.S. Pat. No. 3,522,568 Aug. 4, 1970, for Tape Scale for Position Measuring Transformer by Harold J. Hasbrouck and assigned to Inductosyn Corporation, the assignee of the present application. As explained more fully therein, continuous winding movable member 124 comprises an elastic tape which is stretched between collars 126 and 126' until the windings thereon have the required spacing therebetween. In addition, relatively stationary member 128 having space quadrature windings thereon may be of the type described in the before-mentioned application and include guide members 130 and 130' for maintaining a fixed air gap between the windings on members 124 and 128. In the patent, the tape with the continuous winding is stationary and innermost with respect to the slider, whereas in the present case, the space quadrature member 128 is relatively stationary, being mounted on or carried by the Y axis carriage 58 in a position relatively stationary with respect to the continuous winding tape member 124, with the tape 124 outermost as shown in FIG. 4, mounted on and carried by the probe 82.

The signals derived from X, Y and Z position measuring transformers 103, 114 and 123, respectively, are applied via a suitable analog-to-digital converting system 99 to display 100. Although various control systems and digital display devices can be used within the scope of the present invention, a preferred system is described and shown in U.S. Pat. No. 3,315,253, issued Apr. 18, 1967, to R. Z. Geller for Analog-Digital Converter. Such patent provides for a coarse and fine counter for each axis. The counts are combined to control a display. Although the patent teaches the use of a rotary position measuring transformer as a fine position measuring device, the system could be adapted for use with linear position measuring transformers of the type described and shown in the beforementioned Pat. No. 2,799,835. If a coarse position measuring device is required in the present system, a resolver could be added by means of appropriate gearing or an additional position measuring transformer with a different winding layout could be added. In any event, indicator tubes 101, 101', and 101" indicate positive and negative displacements of probe 82 along the X, Y and Z axes, respectively.

The requirement for manufacturing inspection machines with the same degree of accuracy as will be required in the operation of the machine is avoided by inspection machine 10 due to the construction just described. More specifically, existing inspection machines generally include a plurality of machine ways which support, via ball bearings, the movable carriage. In contrast thereto, inspection machine 10 utilizes a three-point support for supporting carriages 21 and 56. The first two support points are provided by slide bearings 15 and 51 for the X and Y axes, respectively, in which X and Y carriages 21 and 56, respectively, are supported primarily along two lines 95A and 95B, and 96A and 96B, respectively, rather than a plurality of surfaces. In other words, balls 16A and 16B and balls 52A and 52B are located symmetrically with reference to a vertical plane passing through the center of shafts 14 and 50, respectively, and carry the load of carriages 21 and 56 and maintain their alignment parallel to the X and Y axes, respectively. The other rows of balls 16C–16F in slide bearing 15 have clearances which increase toward the bottom rows which have the maximum clearance. In other words, only two rows of balls contact the shafts, the remaining balls, where they exist, being spaced from the shafts to permit the necessary freedom of motion while providing paraaxial constraint and preventing large displacements of carriage 21 in the unconstrained radial directions. Therefore, since support for X and Y axis carriages 21 and 56, respectively, is only along two lines which are parallel to the axes of shafts 14 and 50, the roundness, good finish and exact diameter of shafts 14 and 50 are unimportant. On the other hand, the only requirement is that there exist two linear portions on shafts 14 and 50 which are straight. Furthermore, shafts 14 and 50 may be rotated, as explained more fully hereinafter, while the straightness of the lines contacted by balls 16 and 52 are checked until the best rotational positions of shafts 14 and 50 are determined.

In many prior art machines, only one bearing is provided for supporting a carriage at a particular location. For example, assume that slide bearing 51 comprised a single ball at each end of carriage 56 and assume also that the dimensions of shaft 50 changed to cause a slight depression in the surface thereof. As the leading edge of carriage 56 passed over the depression, carriage 56 would be caused to travel in a non-parallel path. The same action would occur when the bearing at the trailing edge passed through the depression. A similar deviation would occur if the dimensions of shaft 50 changed such that a rise occurred along its surface. Obviously, any measurements taken at that particular location would be in error.

However, by using a plurality of balls 52 as shown, even though the leading ball in raceway section 54A or 54B passes over the depression, carriage 56 is held relativey parallel by the action of the remaining balls. If an increase in the shaft dimension at a particular area occurs, the increase in dimension is minimized in proportion to the number of balls. Even if the diameter of shafts 14 and 50 increased due to a temperature increase, carriages 21 or 56 or both would be forced upwardly by a slight amount but the X and Y measurements would remain unchanged. A decrease in shaft diameter would be similarly compensated for by the combined action of the bearings.

The third support point of the three point support is evidently required since the off-axis weight of shaft 50 tends to rotate X axis carriage 21 in a counterclockwise direction and the off-axis weight of probe 82 tends to rotate Y axis carriage 56 in a counterclockwise direction. This third support point for X axis carraige 21 is provided by constraint, slide bearing 29. In other words, as X axis carraige 21 moves along shaft 14, roller 34 rolls along front surface 32 of track 31 preventing rotation of carriage 21 and maintaining shaft 50 level. In addition, the necessity for carefully machining and locating track 31 is completely eliminated since it is supported by screws 30 at periodic locations along the length of support member 28 and is capable of adjustment. Therefore, after installation of track 31 and with screws 30 tightened only slightly, the motion of X axis carriage 21 can be checked, as explained more fully hereinafter, for exact horiontal motion without pitching of shaft 50. If a point along the path of motion of X axis carriage 21 is found where shaft 50 pitches upwardly or downwardly, track 31 may be tapped to move it slightly to compensate for the pitching of shaft 50. After the position of track 31 is such that no pitching of shaf 50 occurs during the entire displacement of X axis carraige 21, screws 30 may be tightened to secure track 31 in place.

After the straightness of shaft 14 and the position of track 31 have been determined, the X axis is fully calibrated and capable of making positional measurements with a higher degree of accuracy than required in the construction of shaft 14 and track 31. Similar results are obtainable along the Y axis in essentially the same manner as just described. More specifically, shaft 30 may be rotated until the lines contacted by balls 52A and 52B are straight. In the case of shaft 50, the determination of the location of the two straightest lines 96A and 96B thereon must be determined prior to final assembly to plate 46. In other words, prior to assembly of shaft 50 to plate 46, it must be tested to insure that Y axis carriage 56 is moving in a straight line along the Y axis and not in a curved path in the horiontal (yaw) plane which contains the Y axis. For this purpose, shaft 50 may be mounted between suitable V blocks with carraige 56 and slide bearing 51 installed thereon. An auto-collimator is then mounted on a solid base and aligned along shaft 50 and a flat mirror is mounted on the top of Y axis carriage 56. Such mirror is adapted to reflect the auto-collimator reticle back upon itself. Y yaw angular motion will cause an in and out motion in a horizontal plane of tip 90 that is proportional to the horizontal distance of the center line of probe 82 to Y scale 115. Therefore, to eliminate such yaw motion, Y carriage 56 is slowly moved from one end of shaft 50 to the other, and the maximum angular deflection in the horizontal plane is noted. The yaw error can be corrected by rotation of Y shaft 50 about its axis. Thereafter, with the preferred rotational position of shaft 50 determined, it is ready to be secured to plate 46. For this purpose, plate 46 includes a hole 48, the diameter of which is slightly less than the diameter of shaft 50 so that shaft 50 and plate 46 may be shrink-fitted together. More specifically, plate 46 is heated to at least 450° F. and then placed on an insulating surface. Shaft 50 is then inserted into hole 48 which has been expanded due to the heat. After cooling, shaft 50 will be securely locked into plate 46. Once the straightness of lines 96A and 96B on shaft 50 is determined, the position of track 66 may be adjusted until it is determined that no pitching of probe 82 occurs during the entire length of travel of Y axis carriage 56.

Figure 3:
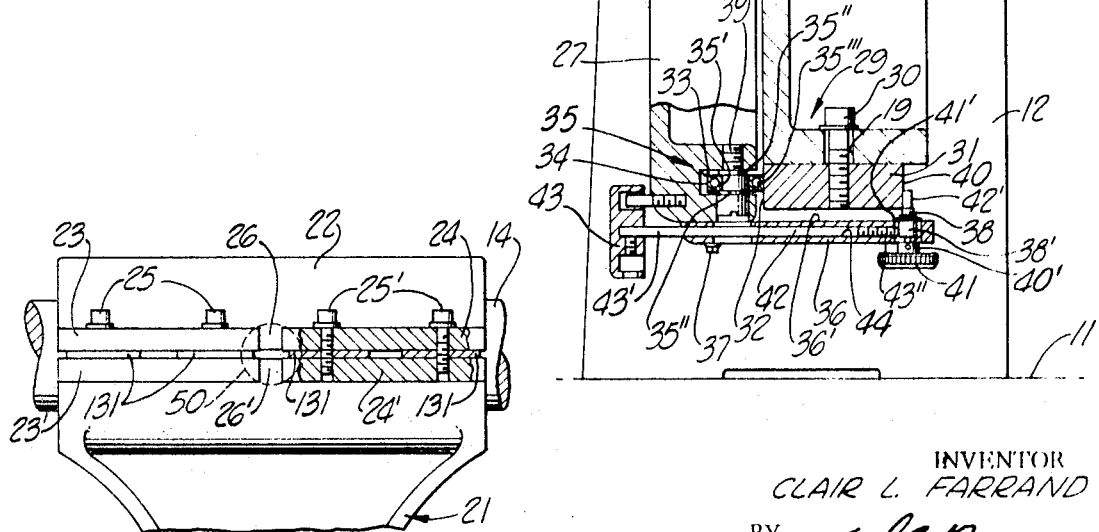
FIG. 3 is a reduced, rear elevation view taken along the line 3—3 in FIG. 2.

The present inspection machine 10 also permits the adjustment of the perpendicularity between X and Y axis shafts 14 and 50. More specifically, if it is determined that the angle between Y axis shaft 50 and X axis shaft 14 is not exactly 90°, a suitable adjustment may be made as follows. With reference to FIGS. 2 and 3, shims 131 are adapted to be positioned between flanges 23, 23' and 24, 24' at the back of X axis carriage 21. By varying the sizes of the shims inserted and by varying the tension of screws 25 and 25', Y axis shaft 50 may be caused to deflect in both horizontal and vertical planes. For example, if the shims inserted between flanges 23 and 23' are smaller than the shims inserted between flanges 24 and 24', and the tension on screws 25 is greater than the tension on screws 25', shaft 50 will tend to deflect towards the left, as viewed from the rear, and downwardly. Such deflection in the horizontal plane may be used to adjust the angle between shaht 50 and shaft 14. In addition, the deflection in the vertical plane may be compensated for by adjusting the position of track 31.

A typical procedure for inspection, assembling and calibrating inspection machine 10 is as follows. Inspection machine 10 should be assembled on a sturdy, flat table, preferably black granite. After base 11 has been solidly supported at at least three points, X axis shaft 14 and X axis carriage 21 are installed between upright members 12 and 13 by inserting shaft 14 through hole 140' in upright member 13, through split collar 141', through opening 55 in carriage 21, and finally through split collar 141 and hole like 140' in upright member 12. shaft 14 should be hard, chrome-plated steel having a reasonable degree of surface finish and freedom from blemishes. Plate 46 and shaft 50 are then secured to X axis carriage 21 by means of screws 47. The approximate level of shaft 50 may be checked by insuring that the same force is required to move Y carriage 56 in either direction. If it is determined that shaft 50 is not exactly level, plate 46 and shaft 50 may be removed from carriage 21 and supported horizontally on a lathe. By slowly rotating shaft 50 and plate 46 and by taking fine lathe cuts on the back surface 49 of plate 46, perpendicularity between surface 49 and shaft 50 may be achieved. The position measuring transformers 103, 114 and 123 can then be installed together with probe 82.

Inspection machine 10 is now ready for final alignment. The first test is to insure that X axis caraige 21 is moving in a straight line along the X axis and not in a curved path in either the vertical (pitch) or horizontal (yaw) planes which contain the X axis. For this purpose, an auto-collimator is mounted on a solid base and aligned along the axis of shaft 14. A flat mirror mounted on the top of carriage 21 is used to reflect the auto-collimator reticle back upon itself. At this point, X shaft 14 has been assembled and rotated to its best position as a result of its initial inspection and assembly. Therefore, carriage 21 is slowly moved from one end of shaft 14 to the other, and the maximum angular deflections, respectively, in the vertical and horizontal planes are noted. Due to the geometry of inspection machine 10, such unwanted motion would cause probe 82 to swing in the vertical plane and exhibit an X error and in the horizontal plane and exhibit a Y error, the magnitude of these errors depending upon the distance of tip 90 vertically or horizontally, as the case may be, from the X axis. The magnitude of the yaw errors can be corrected by loosening screws 144 and 144' and rotating shaft 14. The general slope of the pitch errors can be corrected by loosening screws 142 and 142' and leveling shaft 14.

The next test is to determine the precision of motion of X carriage 21 along the X axis relative to rotation about the X axis. Such rotation would cause tip 90 to move in and out (when viewed from the front) in proportion to the vertical distance between tip 90 and the X–Y axis centerline. To correct for this, a precision level may be mounted on the top of X carriage 21, perpendicular to the axis of X travel. Track 31 is then adjusted to bring the level meter to zero. Screws 30 may be loosened to shift track 31 as necessary. This procedure is then repeated at various positions of travel along the X axis until level is maintained throughout. After reaching the allowable limits, the tightness of screws 30 is gradually increased while monitoring the precision level to insure that the tightening process does not displace track 31.

The next test is to insure that Y axis carriage 56 is moving in a straight line along the Y axis and not in a curved path in the vetrical (pitch) plane which contains the Y axis. For this purpose, an auto-collimator is mounted on a solid base and aligned along shaft 50 and a flat mirror is mounted on the top of Y axis carriage 56. Such mirror is adapted to reflect the auto-collimator reticle back upon itself. At this point, shaft 50 has been assembled and rotated to its best position as a result of its initial inspection and assembly to eliminate yaws errors. Y pitch angular motion will cause tip 90 to move in and out in a vertical plane (when viewed from the front) proportional to the distance of tip 90 to the centerline of Y scale 115. Therefore, to eliminate such pitch motion, Y carriage 56 is slowly moved from one end of shaft 50 to the other, and the maximum angular deflection in the vertical plane is noted. As was the case with shaft 14, the general slope of the pitch errors can be corrected by leveling Y shaft 50. This can be accomplished either by taking cuts with a lathe in surface 49 of plate 46 or by moving track 31 in a direction which is parallel to the Y axis.

The next test is to insure the proper motion of Y carriage 56 along the Y axis to avoid rotation about this axis. A rotation will cause tip 90 to move in a left or right direction (when viewed from the front) causing an error proportional to the distance of tip 90 to the centerline of Y shaft 50. Adjustment is made as before using a precision level mounted on the top of Y axis carriage 56 and adjusting the position of track 66.

X–Y perpendicularity is finally aligned by securing X carriage 21 against movment by loosening knob 43 to permit shaft 38 to engage surface 40 of track 31, as previously explained. An auto-collimator is mounted on a solid base and aligned along Y shaft 50. An X–Y optical square fixture is then mounted to reflect a portion of the light from the auto-collimator onto Y shaft 50 and a portion onto X shaft 14. Mirrors are positioned on shafts 14 and 50 to reflect the auto-collimator reticle back upon itself. When the vertical lines of the X image and Y image are coincident, Y shaft 50 is exactly perpendicular to X shaft 14. If shafts 14 and 50 are not perpendicular, correction may be made by slightly loosening screws 25 and 25' and inserting appropriate shims 131 as described previously.

It can, therefore, be seen that by following the teachings of the present invention, the necessity for manufacturing the machine elements with the same degree of accuracy as will be required in the inspection of a workpiec may be eliminated. By providing an inspection machine in which critical machine dimensions are adjustable, the necessity for spending large sums to exactly size all critical parts is eliminated. More specifically, and as explained more fully hereinbefore, X shaft 14 may be leveled and rotated until straight lines thereon are located. Track 31 is easily adjusted to eliminate pitch of Y axis shaft 50. Track 31 may also be used to adjust Y axis shaft 50 until level and Y axis shaft 50 may be rotated prior to installation until two straight lines thereon are located. Finally, track 66 may be adjusted to prevent pitching of probe 82 and screws 25 may be adjusted to control the angle between the X and Y axes in the X–Y plane.

When it is desired to locate the position of, for example, a hole by means of a tapered probe, probe 82 is graspe din the hand of the operator and moved until in the vicinity of the hole. It should here be noted that since the hand of the operator contacts Y axis carriage 56 and since Y axis carriage 56 is lighter than X axis carriage 21, the angle between the two rows of balls 52A and 52B which support Y axis carriage 56 is 120°. With such a spacing, more of the weight of carrigae 56 is resolved into a horizontal plane thereby giving increased stability to probe 82 and Y axis carriage 56. On the other hand, since X axis carriage 21 is substantially heavier and the hand of the operator generally does not directly contact X axis carriage 21, the spacing between the upper two rows of balls 16A and 16B is only 60°.

Once in the vicinity of a hole whose position is to be located, tapered tip 90 is inserted into the hole. If tip 90 of probe 82 is not exactly centered with respect to the hole, both cariages 21 and 56 will be rocked due to their displacement and misalignment. However, due to the weight of probe 82, gravity will urge it downwardly displacing and re-aligning the cariages of both axes as it does so until it comes to rest with the axis of probe 82 setting normal to the plane of the periphery of the hole and with the surface of tip 90 contacting the entire periphery of the hole. It should be noted that probe 82 has sufficient weight to center tip 90 in the hole without any external force and to cause both carriages 21 and 56 to automatically displace and align themselves along the X and Y axes, respectively. It is evident that this action requires that both cariages 21 and 56 move freely along the X and Y axes and be capable of rolling into alignmet with such axes and also that probe 82 move freely in its bearing along the Z axis. If this were not the case, a false position would be measured. However, the present bearing arrangement insures the necessary freedom of bearing action. Furthermore, it should be noted that once positioned in such a hole, the weight of probe 82 is borne entirely by the work and its weight has no effect on Y axis carriage 56.

Inasmuch as shafts 14 and 50 are in cylindrical form, if a shock occurs, carriages 21 and 56 can assume their original positions. For example, if Y axis carriage 56 is subjected to a shock which causes the carriage to undergo slight clockwise motion about the Y axis, after the shock has been removed, the weight of carriage 56 would rotate roller 70 into place against surface 67 of track 66 and realignment would be unnecessary. A similar situation would exist in the presence of a shock to X axis carriage 21. In most prior art machines, such a shock would cause the carriage to become displaced from its machine ways and in the process, bearings on both sides of the carriage could have been forced out of alignment, rendering the machine inoperable until realigned.

Similarly, if inspection machine 10 is subjected to temperature increases which cause shafts 14 and 50 to expand slightly, binding will not occur since carriages 21 and 56 are permitted a substantial amount of vertical motion with respect to shafts 14 and 50. Bearings 16 and 52 would continue to support the carriages and rollers 34 and 70 would continue to provide a constraint bearing to prevent rotation of carriages 21 and 56, respectively, about the X and Y axes. In prior art machines, on the other hand, temperature changes often prevent the carriages from moving.

While the invention has been described with respect to a preferred physical embodiment constructed in accordance therewith, it will be apparent to those skilled in the art that various modifications and improvements may be made without departing from the scope and spirit of the invention.

I claim:

1. Measuring apparatus comprising,
   a horizontal cylindrical shaft having an upper surface along the lengthwise direction of said shaft for providing first and second carriage supports, one support on each side of said upper surface,
   first and second recirculating ball bearing means spaced on either side of said upper surface for rotating and translating on said upper surface, said first and second ball bearing means having balls for contacting only said upper surface along first and second, parallel, flat, spaced, straight-line areas, respectively, said straight-line areas defining said first and second carriage supports, respectively,
   a guide having on one side a guide surface spaced from, parallel to, and fixed with respect to said shaft, said guide surface defining a third carriage support,
   a movable carriage rigidly connected to said first and second ball bearing means,
      said carriage having a fixed arm extending normal to said shaft and carrying a rolling bearing spaced from said shaft,
      said carriage having a center of gravity positioned off-center with respect to said shaft thereby tending to cause said carriage and said ball bearing means to rotate and maintain said rolling bearing in contact with said guide surface only on one side of said guide, and
      said first, second and third carriage supports providing the only constraints to movement of said carriage along said shaft.

2. The apparatus according to claim 1 comprising means for supporting said guide below said shaft, and means for adjusting said guide surface into parallelism with said shaft.

3. The apparatus according to claim 1 wherein said horizontal shaft forms an $x$ axis and said carriage is an $x$ carriage, said apparatus further including,
   a horizontal cylindrical $y$ shaft fixed at one end to and protruding from said $x$ carriage to form a $y$ axis,
   a $y$ carriage slidable on said $y$ shaft and carrying an upright probe adjustable along a $z$ axis, said $y$ carriage having separate ball bearing means operatively contacting opposite sides of the upper surface of said $y$ shaft only along two lines parallel to the longitudinal axis of said $y$ shaft, and said $y$ carriage having means below said $y$ shaft for preventing rotation of the $y$ carriage about said $y$ shaft and for guiding the $y$ carriage parallel to said $y$ axis.

4. The apparatus according to claim 3 further including position-measuring transformers mounted along each of said $x$, $y$, and $z$ axes for providing signals indicative of the movement of said $x$ and $y$ carriages and said probe, and a display for reading out the precise position of said probe.

References Cited

UNITED STATES PATENTS

| | | | |
|---|---|---|---|
| 2,353,726 | 7/1944 | Guttmann | 33—125 R |
| 3,059,337 | 10/1962 | Lynch | 33—189 X |
| 3,116,556 | 1/1964 | Nyberg et al. | 33—189 X |
| 3,202,948 | 8/1965 | Farrand | 336—115 |
| 3,384,970 | 5/1968 | Avalear | 33—189 |
| 3,522,568 | 8/1970 | Hasbrouck | 336—20 |
| 2,628,135 | 2/1953 | Magee | 308—6 |
| 3,123,108 | 3/1964 | Gaskell et al. | 308—6 |
| 3,434,218 | 3/1969 | Potter | 308—6 X |

FOREIGN PATENTS

| | | | |
|---|---|---|---|
| 1,352,964 | 1/1964 | France | 308—6 |

WILLIAM D. MARTIN, JR., Primary Examiner

U.S. Cl. X.R.

33—125 R, 189; 308—6 R